US010874115B2

(12) United States Patent
Perez Gallardo et al.

(10) Patent No.: US 10,874,115 B2
(45) Date of Patent: Dec. 29, 2020

(54) EDIBLE AND THERMOREVERSIBLE OLEOGEL AND METHOD FOR PREPARATION THEREOF

(71) Applicant: SIGMA ALIMENTOS, S.A. DE C.V., Nuevo Leon (MX)

(72) Inventors: Alfonso Perez Gallardo, Morelia Michoacan (MX); Blanca Alejandra Granados Corzo, Jalisco (MX); Gregorio Jose De Haene Rosique, Nuevo Leon (MX)

(73) Assignee: Sigma Alimentos, S.A. DE C.V., Nuevo Leon (MX)

( * ) Notice: Subject to any disclaimer, the term of this patent is extended or adjusted under 35 U.S.C. 154(b) by 106 days.

(21) Appl. No.: 16/060,811

(22) PCT Filed: Dec. 8, 2016

(86) PCT No.: PCT/MX2016/000131
§ 371 (c)(1),
(2) Date: Jun. 8, 2018

(87) PCT Pub. No.: WO2017/099574
PCT Pub. Date: Jun. 15, 2017

(65) Prior Publication Data
US 2018/0352826 A1    Dec. 13, 2018

(30) Foreign Application Priority Data

Dec. 9, 2015  (MX) .................. MX/a/2015/016900

(51) Int. Cl.
| A23D 7/005 | (2006.01) |
| A23D 7/04 | (2006.01) |
| A23D 9/013 | (2006.01) |
| A23L 29/00 | (2016.01) |
| A23L 35/00 | (2016.01) |
| A23D 7/01 | (2006.01) |
| A23D 9/04 | (2006.01) |

(52) U.S. Cl.
CPC .......... *A23D 7/005* (2013.01); *A23D 7/0053* (2013.01); *A23D 7/0056* (2013.01); *A23D 7/011* (2013.01);
(Continued)

(58) Field of Classification Search
CPC ...... A23V 2250/192; A23V 2250/1882; A23V 2250/188; A23V 2250/1842;
(Continued)

(56) References Cited

FOREIGN PATENT DOCUMENTS

WO    WO 2013/111058 A1    8/2013

OTHER PUBLICATIONS

Verstringe et al., "Influence of a commercial monoglycerol on crystallization mechanism of palm oil as compared to its pure constituents". Food Research International 62 (2014) 694-700. (Year: 2014).*

(Continued)

*Primary Examiner* — Erik Kashnikow
*Assistant Examiner* — Assaf Zilbering
(74) *Attorney, Agent, or Firm* — Muncy, Geissler, Olds & Lowe, P.C.

(57) ABSTRACT

An edible and thermoreversible oleogel comprising an oil or mixture of oils, grease or mixtures of fats and a structuring agent or mixture of structuring agents on the basis of a distilled monoglyceride of saturated fatty acid having from 12 to 24 carbon atoms that contains more than 90% by weight of monoglycerides, the monoglycerides of the saturated fatty acid are at least 40% by weight of monoglycerides of stearic acid and at least 30% by weight of monoglycerides of palmitic acid. The oleogel is prepared by the combination of oil, grease, and the structuring agent followed by a heating of the mixture, which is then cooled to obtain the oleogel. The resulting oleogel can be used as a substitute for fat in food products.

5 Claims, 6 Drawing Sheets

(52) U.S. Cl.
CPC ............... *A23D 7/013* (2013.01); *A23D 7/04* (2013.01); *A23D 9/013* (2013.01); *A23D 9/04* (2013.01); *A23L 29/04* (2016.08); *A23L 35/10* (2016.08); *A23V 2002/00* (2013.01); *A23V 2200/222* (2013.01); *A23V 2250/188* (2013.01); *A23V 2250/1842* (2013.01); *A23V 2250/1874* (2013.01); *A23V 2250/1882* (2013.01); *A23V 2250/1886* (2013.01); *A23V 2250/192* (2013.01); *A23V 2300/24* (2013.01)

(58) Field of Classification Search
CPC ...... A23V 2300/24; A23D 9/04; A23D 9/013; A23D 7/005; A23D 7/011; A23L 29/04; A23L 35/10
See application file for complete search history.

(56) References Cited

OTHER PUBLICATIONS

Lupi et al "Effect of Organogelator and Fat Source on Rheological Properties of Olive Oil-Based Organogels" Food Research International 46 (2012) 177-184. (Year: 2012).*

Verstringe et al., "Influence of a Commercial Monoacylglycerol on the Crystallization Mechanism of Palm Oil as Compared to Its Pure Constituents". Food Research International 62(2014) 694-700. (Year: 2014).*

Rocha-Annador et al., "Influence of Commercial Saturated Monoglyceride, Mono-/Diglycerides Mixtures, Vegetable Oil, Stirring Speed, and Temperature on the Physical Properties of Organogels". International Journal of Food Science, vol. 2014. (Year: 2014).*

Giacomozzi et al., "Effect of the preparation conditions on the rheological and textural properties of monoglyceride oleogels". World Congress on Oils & Fats and 31st ISF Lectureship Series (Oct. 2015). (Year: 2015).*

Lupi et al., "Stabilization of Meat Suspnsions by Organogelation: A Rheological Approach" European Journal of Lipid Science Technology, 2012, 114, pp. 1381-1389. (Year: 2012).*

Ogutcu et al., "Oleogels of Virgin Olive Oil With Carnauba Wax and Monoglyceride as Spreadable Products". Grasas Aceites 65(3) Jul.-Sep. 2014. (Year: 2014).*

Lupi, F.R. et al.; "Effect of Organogelator and Fat Source on Rheological Properties of Olive Oil-Based Organogels"; Food Research International, 2012, vol. 46, pp. 177-184.

Page Web Sheffieldbioscience.com. Myverol 18-04K. Mar. 13, 2015 [online][retrieved on Apr. 19, 2017], http://www.sheffieldbioscience.com/myverol1804K/>.

* cited by examiner

EDIBLE AND THERMOREVERSIBLE OLEOGEL AND METHOD FOR PREPARATION THEREOF

TECHNICAL FIELD OF THE INVENTION

This invention relates to the field of oils and fats, and a more precisely, to an oleogel composition based on oil and grease whose gelling is achieved with the addition of a distilled monoglyceride of saturated fatty acid as structuring agent.

BACKGROUND OF THE INVENTION

The excessive consumption of saturated and trans fats has been associated with a high risk of cardiovascular diseases and diabetes, among other diseases. For this reason, one of the current challenges of the food industry is to find substitutes to replace fats without losing the attributes that they confer to food. This led to the development of strategies of transforming oils (liquid) in semi-solid structures, the so-called "oleogeles". An alternative to the formation of oleogeles is the use of hydrophobic polymers, among which are the derivatives of cellulose such as ethyl cellulose. The main obstacle for the preparation of this type of gels, is the need to warm up the polymer previously dispersed in the oil phase above its glass transition temperature (Tg; about 140° C.). Once reached this temperature, a homogeneous suspension is obtained that jellifies when cooled to room temperature. This warming mainly produces oxidation of lipids, generating bad odors and flavors, moreover with the possibility of forming toxic compounds. This is getting even worse if one considers that the required time for warming up increases with the concentration of the polymer, which is relatively high when strong and resistant gels are intended to be obtained (between 3% and 10%, according to different authors).

In order to solve the problems that arise in the processing of certain foodstuffs when replacing solid fats oils by oils with a higher content of unsaturated fatty acids have different strategies. One of these strategies is presented in this invention and which is based on immobilizing the liquid oil with the help of structures that are caused by addition of distilled monoglycerides of saturated fatty acids in the presence of fat crystals from fractions of a high melting point. Thus, the oil obtains properties similar to those of solid fats and in this way it can be used as a substitute for these enabling the improvement of the fatty acid profile of the product, and maintaining the organoleptic characteristics of the same.

SUMMARY OF THE INVENTION

In view of the above, and with the purpose of finding a solution to the limitations found, it is object of the invention to provide an edible and thermoreversible oleogel comprising an oil or mixture of oils, a structuring agent or a mixture of agents structuring, and a fat or fat mixture, such that the structuring agent is a distilled monoglyceride of saturated fatty acid having from 12 to 24 carbon atoms that contains more than 90% by weight of monoglycerides, the monoglycerides of the saturated fatty acid are at least 40% by weight of monoglycerides of stearic acid and at least 30% by weight of monoglycerides of palmitic acid.

It is also the object of the invention to provide the use of the composition of an edible and thermoreversible oleogel as mentioned above as a replacement of a fat fraction to produce a food product selected from a dairy product, a meat product, a product of meat emulsion, and a bakery product.

Finally, it is also the object of the invention to provide a method for producing an edible and thermoreversible oleogel. The method has the steps of: preparing a mixture of oil and grease; adding a structuring agent to the mixture of oil and grease, the structuring agent is a distilled monoglyceride of saturated fatty acid having from 12 to 24 carbon atoms containing more than 90% by weight of monoglycerides, the monoglycerides of the saturated fatty acid are at least 40% by weight of monoglycerides of stearic acid and at least 30% by weight of monoglycerides of palmitic acid; and heating the mixture of oil, grease and structuring agent at a temperature from 65° C. to 90° C.

BRIEF DESCRIPTION OF THE FIGURES

Other features of the present invention will be apparent from the following detailed description considered in connection with the attached drawings. It should be understood, however, that the drawings are made only as an illustration and not as a restrictive definition of the invention, in which.

DETAILED DESCRIPTION OF THE INVENTION

The characteristic details of this invention are described in the following paragraphs, which are intended to define the invention, but without limiting its scope.

The invention is directed to an edible and thermoreversible oleogel, and food products that contain such oleogel.

The oleogel is prepared adequately by the combination of an oil or mixture of oils, grease or fat mixture with a structuring agent and by heating the mixture to a temperature above the melting temperature of the compounds. Once the composition has completely dissolved and the solution is clear, it is cooled.

The term "oleogel" refers, in the context of the present invention, to a gel that has a continuous oil phase containing a structuring or gelling agent and other compounds equally distributed in the gel phase. The oleogel has physical properties of a solid or semi-solid. The oleogel is basically anhydrous, that is, it conveniently has a water content of about 1% by weight. However, it can be used to produce of water-in-oil type emulsions.

According to the invention the oleogel is edible. Therefore, as an additional aspect, the present invention provides a food product that comprises an oleogel in accordance with the invention. The food product can be produced through a mixture of food components with an oleogel in accordance with the invention. The mixture can be produced with the oleogel in its gelled state, or with the oleogel composition liquefied in the state after the cooling.

The term "food product" means, in the context of the present invention, edible products containing also a convenient way to one or more selected ingredients of carbohydrates (for example, sugars and starches), proteins, dietary fiber, water and flavoring agents such as salt. Appropriately, the food product contains at least about 1% by weight of oleogel, for example at least about 5%, 10% or 15% by weight of oleogel. Appropriately, the food product contains less than about 95% by weight of oleogel, for example less than about 90% by weight of oleogel.

In some forms, the food product in accordance with the present invention is a meat product. For example, a product of cold meats such as ham, beef and hamburger meat, or a meat emulsion product for the preparation of for example of sausages. Typically, the meat products of the present invention comprise about 10% to about 25% protein, about 5% to about 35% by weight of oleogel of the present invention and about 40% to about 60% by total weight of water.

Typically, the meat emulsion products are prepared by grinding, mixing and emulsification of a mixture of raw meat such as beef or pork products derived from meat, oleogel of the present invention and other ingredients such as brine, spices, flavorings, vegetable proteins and coloring agents to produce an emulsion which contains fine fat particles covered by proteins. The proteins are dissolved either by ingredients of meat and/or derivatives of protein added as vegetable protein or whey. In the case of a cold meat, the resulting meat emulsion is cured. The emulsion is subsequently processed by heat. The heating of the emulsion of meat causes the protein contained in the same clot to form an elastic texture, semi-solid. This structure traps the fat particles forming an emulsion product of firm flesh. The emulsion product of the resulting meat is a uniform, homogeneous mass, which may also contain pieces of meat or other inclusions.

In some forms, the food product in accordance with the present invention is a dairy product. For example, a cheese product, where the incorporation of the oleogel as a replacement or substitute for fat is carried out, preferably, at the stage of preparation of the curd. Typically, the cheese of the present invention comprises about 10% to about 30% protein, about 5% to about 35% by weight of oleogel of the present invention and about 28% to about 62% by weight of total water.

In another modality, the food product in accordance with the present invention is a bakery product. For example, cookies, where the incorporation of the oleogel as a replacement or substitute for fat is carried out, preferably, at the stage of preparation of the dough.

The replacement of a fraction of the fat present in the food products by oils, vegetable oils, preferably has as a result products of meat, dairy or bakery which has a non-acceptable texture and organoleptic properties when cooked or chewed due to the production of fat food and its oily appearance. However, the replacement of a fraction of the fat by an oleogel in accordance with the present invention results in meat products, dairy products and bakery products that do not present these problems.

The term "thermoreversible" means, in the context of the present invention, that it can be converted from a gel phase at room temperature to a liquid phase at a temperature high above room temperature. The term "thermoreversible" also includes the preferred term "thermo-interchangeable", which means that you can convert from a phase of gel at room temperature to a liquid phase at a temperature high above room temperature and it can be converted back to a gel phase when it cools to room temperature or lower.

By "room temperature" is meant a temperature between 20° C. to 25° C. By "high temperature above room temperature" a temperature superior of 25° C. is meant.

The composition of edible and thermoreversible oleogel of the present invention includes:

A) Oils or Mixture of Oils

Various types of edible oils can be used, but are not limited to, soybean oil, olive oil, canola oil, corn oil, sunflower oil, safflower oil, coconut oil, cotton seed oil, linseed oil, almond oil, peanut oil, algae oil, palm oil, palm stearin, palm olein, hydrogenated palm oil, hydrogenated palm stearin fat, high oleic soybean oil, high oleic canola oil, high oleic sunflower oil, high oleic safflower oil, fully hydrogenated soybean oil, fully hydrogenated canola oil, cotton seed oil fully hydrogenated sunflower oil high stearic acid, enzyme interesterified oils and chemically and combinations thereof.

The amount of oil or mixture of oils in the oleogel composition of the present invention is typically from 50% to 95% by weight.

Soybean oils, olive oil, canola oil and palm oil oils are preferred for the formation of the oleogel of the present invention because of their fatty acid profile of saturated, monounsaturated and polyunsaturated fatty acids that allow making different mixtures, limiting the content of saturated fatty acids and by setting the content of monounsaturated fatty acids and polyunsaturated fatty acids within a range in which the oleogel displays the desired rheological properties. For example, canola oil has the advantage of containing about 8% by weight of saturated fatty acids, whereas soybean oils and olive oil contain about 16% by weight and 14.56% by weight, respectively. On the other hand the content of monounsaturated fatty acids for canola oil is around 66% by weight, whereas for the oils of olive and soy it is about 23% and 78%, respectively. Finally, the content of polyunsaturated fatty acids is of about 25% by weight in canola oil, while for the oils of olive and soy it is around 59% and 6% respectively. On the other hand, palm olein, although it has a saturated fatty acid content of about 46% by weight, a palm olein is preferred that is about 43% by weight of monounsaturated fatty acids and about 10% by weight of polyunsaturated fatty acids because when cooled below its crystallization temperature it forms small crystals that allow modular textures of the final product. In addition, soybean oil is preferred because of its high content of linoleic acid of about 52% by weight. Meanwhile the olive oil and canola oil are preferred because of their oleic acid content of about 77% by weight of 64% by weight, respectively.

In terms of fatty acids, the composition of the soybean oil that can be used in the invention is as follows:
  from 16.31% to 16.53% by weight of fatty acids;
  from 23.42% to 23.54% by weight of monounsaturated fatty acids; and
  from 59.94% to 60.05% by weight of polyunsaturated fatty acids.

In terms of components, the fatty acid composition of soybean oil used in the invention is as follows:

from 11.15% to 11.17% by weight of palmitic acid;
from 23.04% to 23.15% by weight of oleic acid;
from 52.99% to 53.01% by weight of linoleic acid;
from 6.71% to 6.68% by weight of alpha-linolenic acid; and
from 3.99% to 4.03% by weight of stearic acid.

In terms of fatty acids, the composition of canola oil that can be used in the invention is as follows:
from 8.16% to 8.51% by weight of saturated fatty acids;
from 66.07% to 66.28% by weight of mono-unsaturated fatty acids; and
from 25.23% to 25.35% by weight of polyunsaturated fatty acids.

In terms of components, the fatty acid composition of canola oil used in the invention is as follows:
from 4.63% to 4.65% by weight of palmitic acid;
from 64.31% to 64.55% by weight of oleic acid;
from 17.93% to 18.03% by weight of linoleic acid;
from 6.68% to 6.72% by weight of alpha-linolenic acid; and
from 2.13% to 2.15% by weight of stearic acid.

In terms of fatty acids, the composition of the palm oil that can be used in the invention is as follows:
from 46.15% to 55.96% by weight fatty acids;
from 34.88% to 43.23% by weight of monounsaturated fatty acids; and
from 8.68% to 10.57% by weight of polyunsaturated fatty acids.

In terms of the fatty acid profile, the composition of the palm oil used in the invention is as follows:
from 38.54% to 39.44% by weight of palmitic acid;
from 34.55% to 42.86% by weight of oleic acid;
from 8.43% to 10.28% by weight of linoleic acid;
from 4.47% to 6.13% by weight of stearic acid; and
from 0.96% to 2.93% by weight of myristic acid.

In terms of fatty acids, the composition of the olive oil that can be used in the invention is as follows:
from 13.8% to 15.3% by weight of saturated fatty acids;
from 74.7% to 82.6% by weight of monounsaturated fatty acids; and
from 6.4% to 7.1% by weight of polyunsaturated fatty acids.

In terms of the fatty acid profile, the composition of the olive oil used in the invention is as follows:
from 10.07% to 11.14% by weight of palmitic acid;
from 73.53% to 81.27% by weight of oleic acid;
from 5.67% to 6.28% by weight of linoleic acid;
from 3.1% to 3.42% by weight of stearic acid; and
from 0.7% to 0.77% by weight alpha-linoleic acid.

B) Fats or Mixture of Fats

A selection and proper relationship of fat is added to oil or to the mixture of oils. The fats that can be used are of plant or animal origin.

Among the vegetable fats, the following can be used: fats of soybeans, of cotton, of fractionated palm fat, fully hydrogenated palm fat, palm kernel oil, palm stearin, coconut fat, fully hydrogenated vegetable fat and combinations thereof.

Among the animal fat that can be used: butterfat, fat of pork, beef tallow and combinations thereof.

The amount of fat in the oleogel composition of the present invention is typically from 5% to 50% by weight.

(C) Structuring Agent

With the purpose of carrying out the gelling or structuring of the mixture of oils and grease a structuring agent is used, selected from monoglycerids of fatty acids.

The monoglycerides of fatty acids consists of glycerol esterified with a unique fatty acid. According to the invention, the fatty acid is a saturated fatty acid having from 12 to 24 carbon atoms that is selected from the group consisting of arachidic acid, behenic acid, butyric acid, stearic acid, lauric acid, lignoceric acid, myristic acid, palmitic acid and combinations thereof.

The characteristics of the structure generated by the monoglycerides depend not only on the concentration of monoglycerides used, but also on the type of monoglycerides. To obtain a high viscosity and plasticity monoglycerides or mixtures of monoglycerides are preferred with a high degree of saturation. Preferably, monoglycerides are used that are derived from palm oil, palm oil fractions, palm kernel fat, coconut fat, lard, tallow, hydrogenated vegetable oils, partially or completely. Such monoglycerides of fatty acids are preferably rich in palmitic acid or stearic acid, which means at least 40% of these monoglycerides are of stearic acid and at least another 30% are of palmitic acid.

For the present invention, distilled monoglyceride of saturated fatty having from 12 to 24 carbon atoms containing more than 90% by weight of monoglycerides are preferred, and the saturated fatty acid having from 12 to 24 carbon atoms has more than 40% by weight of stearic acid and at least another 30% by weight of palmitic acid. The reason for preferring monoglycerides of fatty acids lies in the fact that these produce organogeles that can be treated mechanically without affecting the development of its structure during the mechanical work of agitation that commonly occurs in various food production processes such as kneading the bread dough, emulsifying of meat products, cutting and pressing of curd cheese, etc.

The distilled monoglyceride of saturated fatty acid has a melting point of 65° C. to 90° C.

The amount of structuring agent in the oleogel composition of the present invention is about 1% to 10% by weight.

F) Emulsifying Agent

In addition, the oleogel composition the present invention may include an emulsifying agent selected from soy lecithin, phospholipids, sorbitan derivatives and combinations thereof. This emulsifying agent is added as an adjuvant in the process of incorporation of the oleogel in an emulsion, especially in dairy products.

The amount of emulsifying agent in the oleogel composition of the present invention is typically less than 1% by weight.

The Preparation Mode

The oleogel composition of this invention can be produced on the basis of the preparation of a mixture of oil and grease; then it adds the structuring agent for later heating continuously—and with agitation—the mixture at a temperature from 65° C. to 90° C., allowing then that the mixture of oil, grease, and structuring agent cools to form the oleogel. Alternatively, during the heating up, an emulsifying agent is added. The oleogel can be incorporated into a food product completely molten or semi-solid according to the application.

In terms of fatty acids, the edible and thermoreversible oleogel of the present presents a composition of:
from 25% to 56% by weight of saturated fatty acids;
from 29% to 55% by weight of monounsaturated fatty acids; and
from 8% to 36% by weight of polyunsaturated fatty acids.

In terms of the fatty acids profile, the edible and thermoreversible oleogel of the present presents a composition of:
from 16% to 45% by weight of palmitic acid;
from 28% to 50% by weight of oleic acid;
from 1% to 10% by weight of stearic acid;
from 9% to 35% by weight of linoleic acid;
from 0.1% to 7% by weight of alpha-linolenic acid
from 1% to 10% by weight of lauric acid; and
from 1% to 3% by weight of myristic acid.

The oleogel composition of the present invention is stable without showing phase separation at a temperature from 4° C. to 25° C.

Rheological Properties crystallization in early stages of the cooling of the mixture of the oleogel compared with fat without monoglyceride and third; the type of monoglyceride of fatty acid impacts the stability of the oleogel shearing efforts, being preferred fatty acids on the unsaturated fatty acids and trans fatty acids.

The oleogel composition of the present invention has a complex modulus G* greater than 0.8 MPa when the sample previously cast from 65° C. to 90° C., cools and crystallizes at a speed of about 2° C./min up to 0° C. and 30 minutes at 0° C., measured at 10 Hz and 0.005% of amplitude.

EXAMPLES OF EMBODIMENT OF THE INVENTION

The invention will now be described with respect to the following examples, which are only for the purpose of representing the way to carry out the implementation of the principles of the invention. The following examples are not intended to be a comprehensive representation of the invention, nor seek to limit the scope of the same.

Examples of Compositions of Edible and Thermoreversible Oleogel 11 different examples of compositions of edible and thermoreversible oleogel were prepared, called F1, F2, F3, F4, F5, F6, F7, F8, F9, F10 and F11 according to the ingredients and quantities shown in Table 1 in accordance with the invention. The preparation consisted in the preparation of the mixture in % by weight and its subsequent fusion at 80° C. for 15 minutes to melt all the materials and mix them.

TABLE 1

| Ingredient (Trade Name) | Examples of composition |  |  |  |  |  |  |  |  |  |  |
|---|---|---|---|---|---|---|---|---|---|---|---|
|  | F1 | F2 | F3 | F4 | F5 | F6 | F7 | F8 | F9 | F10 | 11 |
|  | Amounts in % by weight |  |  |  |  |  |  |  |  |  |  |
| Stearin (H15P1) | 0.00 | 0.00 | 0.00 | 5.00 | 0.00 | 0.00 | 0.00 | 0.00 | 0.00 | 0.00 | 0.00 |
| Soybean oil (L21041504) | 51.00 | 0.00 | 0.00 | 0.00 | 15.80 | 0.00 | 0.00 | 5.03 | 0.00 | 0.000 | 9.83 |
| Palm Olein(L16021) | 0.00 | 0.00 | 7.65 | 0.00 | 15.06 | 36.57 | 0.00 | 0.00 | 0.00 | 0.00 | 5.67 |
| Canola oil (L18310) | 0.00 | 0.00 | 42.66 | 43.72 | 16.01 | 42.09 | 49.87 | 36.87 | 52.80 | 49.32 | 58.18 |
| Palm grease (36 L240209) | 48.00 | 100 | 6.24 | 0937 | 14.79 | 21.34 | 42.80 | 41.69 | 21.34 | 46.67 | 21.31 |
| Palm fat (45 L22031527) | 0.00 | 0.00 | 30.93 | 19.88 | 9.17 | 0.00 | 7.325 | 1641 | 4.26 | 0.00 | 0.00 |
| Palm fat (42 L22031523) | 0.00 | 0.00 | 6.46 | 12.95 | 14.49 | 0.00 | 0.00 | 0.00 | 0.00 | 0.00 | 0.00 |
| Vegetable Fat (Akoroma 44) | 0.00 | 0.00 | 6.06 | 0.00 | 0.00 | 0.00 | 0.00 | 0.00 | 0.00 | 0.00 | 0.00 |
| Hydrogenated Palm Grease | 0.00 | 0.00 | 0.00 | 9.08 | 14.68 | 0.00 | 0.00 | 0.00 | 17.59 | 0.00 | 0.00 |
| Monoglyceride of saturated fatty acid (DMG0093) | 1.00 | 0.00 | 0.00 | 0.00 | 0.00 | 0.00 | 0.00 | 0.00 | 4.00 | 4.00 | 5.00 |

The oleogel composition of the present invention allows the collection of fatty structured systems that during cooling or warming show a phenomenon of crystallization, which from the rheological point of view, may be evidenced by an increase in the complex modulus (G*), which for practical reasons indicates the rigidity of the material or the resistance which it imposes on the flow.

We found three effects of the addition of the structuring agent on the mixture of oils and fats: First, the increase in G* depends on the concentration of the distilled monoglyceride of saturated fatty acid; second, the addition of distilled monoglyceride of saturated fatty acid favors the onset of Compositions F1, F2, F3, F4, F5, F6, F7, F8, F9, F10 and F11 were analyzed to determine their corresponding profile of fatty acids (AGS), polyunsaturated fatty acids (AGP), monounsaturated fatty acids (MUFA) and trans fatty acids (TFA). The fatty acid profile was determined by the method 96.06 of the AOAC (Association of Official Analytical Communities). To do this we used an Agilent 7890 Gas Chromatograph (Santa Clara, Calif., USA). For the analysis of the data, the software ChemStation and also the 37 Component Kit Supelco FAME Mix were used as standards (Sigma Aldrich, St. Louis, Mo., USA). The fatty acid profiles are shown in Table 2, while Table 3 shows the detailed profiles of fatty acids of the fat phases in the Table 2.

TABLE 2

| Profile of fatty acids | Examples of composition | | | | | | | | | | |
|---|---|---|---|---|---|---|---|---|---|---|---|
| | F1 | F2 | F3 | F4 | F5 | F6 | F7 | F8 | F9 | F10 | 11 |
| | % By Weight of fatty acids present in each composition | | | | | | | | | | |
| AGS | 34.86 | 51.49 | 44.00 | 44.00 | 44.00 | 30.70 | 33.07 | 40.00 | 33.36 | 32.84 | 25.00 |
| AGM | 29.12 | 39.05 | 40.50 | 40.52 | 35.96 | 51.18 | 48.74 | 42.21 | 48.94 | 48.96 | 49.88 |
| AGP | 35.81 | 9.26 | 14.91 | 15.06 | 13.67 | 18.00 | 18.00 | 17.59 | 18.00 | 18.00 | 25.00 |
| AGT | 0.21 | 0.20 | 0.60 | 0.42 | 0.58 | 0.12 | 0.19 | 0.19 | 0.60 | 0.20 | 0.12 |
| Total | 100 | 100 | 100 | 100 | 100 | 100 | 100 | 100 | 100 | 100 | 100 |

AGT = trans fatty acids
Sfa = saturated fatty acids
AGM = monounsaturated fatty acids
AGP = polyunsaturated fatty acids

TABLE 3

| Detailed profile of fatty acids | Examples of composition | | | | | | | | | | |
|---|---|---|---|---|---|---|---|---|---|---|---|
| | F1 | F2 | F3 | F4 | F5 | F6 | F7 | F8 | F9 | F10 | 11 |
| | % By Weight of fatty acids present in each composition | | | | | | | | | | |
| Caproic acid C6:0 | 0.01 | 0.022 | 0.06 | 0.05 | 0.03 | 0.006 | 0.026 | 0.04 | 0.01 | 0.01 | 0.01 |
| Caprylic acid C8:0 | 0.18 | 0.247 | 0.80 | 0.62 | 0.41 | 0.089 | 0.327 | 0.53 | 0.19 | 0.17 | 0.08 |
| Capric acid C10:0 | 0.16 | 0.213 | 0.72 | 0.56 | 0.37 | 0.082 | 0.295 | 0.48 | 0.17 | 0.16 | 0.07 |
| Lauric acid C12:0 | 2.17 | 2.754 | 10.03 | 7.73 | 5.10 | 1.090 | 4.067 | 6.64 | 2.34 | 2.13 | 1.00 |
| Tridecanoic acid C13:0 | 0.00 | 0.005 | 0.01 | 0.01 | 0.00 | 0.00 | 0.003 | 0.01 | 0.00 | 0.00 | 0.00 |
| Myristic acid C14:0 | 1.18 | 1.701 | 3.78 | 3.07 | 2.29 | 0.842 | 1.783 | 2.69 | 1.24 | 1.17 | 0.65 |
| Pentadecanoic acid C15:0 | 0.03 | 0.050 | 0.03 | 0.04 | 0.04 | 0.036 | 0.033 | 0.03 | 0.04 | 0.04 | 0.03 |
| Palmitic acid C16:0 | 25.09 | 40.49 | 20.82 | 23.24 | 28.93 | 23.88 | 21.02 | 23.09 | 22.49 | 22.84 | 11.69 |
| Palmitoleic acid C16:1 | 0.11 | 0.189 | 0.15 | 0.15 | 0.14 | 0.189 | 0.180 | 0.16 | 0.18 | 0.18 | 0.18 |
| Heptadecanoic acid C17:0 | 0.10 | 0.099 | 0.06 | 0.07 | 0.09 | 0.073 | 0.068 | 0.07 | 0.07 | 0.07 | 0.07 |
| Cis-10-heptadecenoic acid C17:1 | 0.04 | 0.026 | 0.03 | 0.03 | 0.03 | 0.042 | 0.042 | 0.04 | 0.04 | 0.04 | 0.05 |
| Stearic acid C18:0 | 5.15 | 5.275 | 6.72 | 7.65 | 5.96 | 3.582 | 4.379 | 5.47 | 5.72 | 5.20 | 4.91 |
| Elaidic acid C18:1n9t | 0.21 | 0.195 | 0.59 | 0.42 | 0.57 | 0.120 | 0.189 | 0.19 | 0.59 | 0.19 | 0.12 |
| Oleic acid C18:1n9c | 28.81 | 38.68 | 39.69 | 39.71 | 35.47 | 50.29 | 47.79 | 41.46 | 47.06 | 48.01 | 48.79 |
| Linolelaidic acid C18:2n6t | 0.00 | 0.009 | 0.01 | 0.00 | 0.01 | 0.00 | 0.00 | 0.00 | 0.01 | 0.00 | 0.00 |
| Linoleic acid C18:2n6c | 31.76 | 9.023 | 11.17 | 11.26 | 16.71 | 14.16 | 13.20 | 13.96 | 13.41 | 13.69 | 19.19 |
| Gamma-linolenic acid C18:3n6 | 0.14 | 0.051 | 0.25 | 0.26 | 0.15 | 0.262 | 0.297 | 0.24 | 0.31 | 0.30 | 0.36 |
| Arachidic acid C20:0 | 0.46 | 0.459 | 0.67 | 0.69 | 0.52 | 0.710 | 0.745 | 0.65 | 0.78 | 0.75 | 0.83 |
| Alpha-linolenic acid C18:3n3 | 3.89 | 0.152 | 3.46 | 3.51 | 2.59 | 3.552 | 4.026 | 3.37 | 4.25 | 3.99 | 5.41 |
| Cis-11-eicosenoic acid C20:1n9 | 0.16 | 0.147 | 0.54 | 0.55 | 0.29 | 0.580 | 0.635 | 0.50 | 0.66 | 0.63 | 0.73 |
| Heneicosanoic acid C21:0 | 0.01 | 0.00 | 0.00 | 0.00 | 0.00 | 0.00 | 0.00 | 0.00 | 0.00 | 0.00 | 0.00 |
| Cis-11,14-eicosadienoic acid (C20:2 | 0.02 | 0.00 | 0.03 | 0.03 | 0.02 | 0.026 | 0.031 | 0.02 | 0.03 | 0.03 | 0.04 |
| Acid behenic acid (C22:0 | 0.20 | 0.069 | 0.17 | 0.17 | 0.15 | 0.177 | 0.189 | 0.17 | 0.20 | 0.19 | 0.24 |
| Erucic acid (C22:1n9 | 0.00 | 0.00 | 0.02 | 0.02 | 0.01 | 0.016 | 0.019 | 0.01 | 0.02 | 0.02 | 0.02 |
| Tricosanoic acid (C23:0 | 0.03 | 0.017 | 0.01 | 0.01 | 0.01 | 0.017 | 0.016 | 0.01 | 0.01 | 0.02 | 0.02 |
| Acidolignoceric C24:0 | 0.09 | 0.083 | 0.11 | 0.11 | 0.09 | 0.113 | 0.113 | 0.10 | 0.12 | 0.11 | 0.13 |
| Nervonic acid C24:1n9 | 0.00 | 0.000 | 0.06 | 0.07 | 0.02 | 0.061 | 0.073 | 0.05 | 0.08 | 0.07 | 0.08 |
| cis-4,7,10,13,16,19-docosahexaenoic acid C22:6n-3 | 0.00 | 0.037 | 0.00 | 0.00 | 0.00 | 0.00 | 0.00 | 0.00 | 0.00 | 0.00 | 0.00 |
| Trans-9-palmitelaidic acid C16:1T | 0.11 | 0.00 | 0.14 | 0.12 | 0.10 | 0.048 | 0.122 | 0.15 | 0.06 | 0.10 | 0.05 |
| Trans-9-myristelaidic acid C14:1T | 0.00 | 0.00 | 0.02 | 0.04 | 0.05 | 0.00 | 0.00 | 0.00 | 0.00 | 0.00 | 0.00 |
| Trans-10-pentadecenoic acid C15:1T | 0.00 | 0.00 | 0.01 | 0.02 | 0.02 | 0.00 | 0.00 | 0.00 | 0.00 | 0.00 | 0.00 |

Subsequently, rheograms of the samples of examples were obtained by sweeps of temperature using an AntonPaar rheometer equipped with a P-PTD200 cell and a geometry PP25 outlined to prevent the sample and the geometry from slipping. The space between the geometry and the bottom plate was 1 mm. After establishing the boundary of the linear area of visco elasticity, the temperature program was established, which was a pre-cast at 80° C. for 15 minutes followed by a 80° C. to 0° C. cooling at 2° C. per minute. This speed was chosen to minimize the temperature gradient between the cold base of the Peltier (bottom plate) and the base of the geometry (upper plate). After cooling, it was isothermally maintained at 0° C. for 30 minutes. Then, the sample was again heated to 2° C. per minute up to 80° C. The frequency was set to 10 Hz for a better resolution of torque when the fat is in liquid form, and the minimum temperature was established at 0° C.

Figure 1:
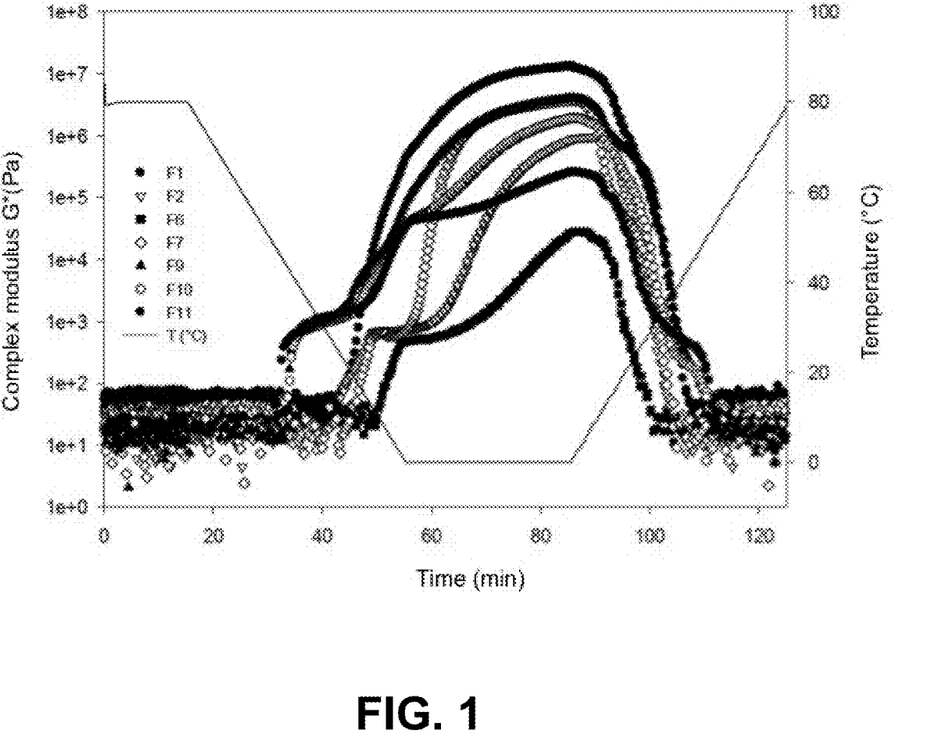
FIG. 1 shows a rheogram G* vs. time (t) and G* vs. Temperature (T) of some examples of embodiment of oleogel compositions for spreadable margarine according to the invention.
Figure 2:
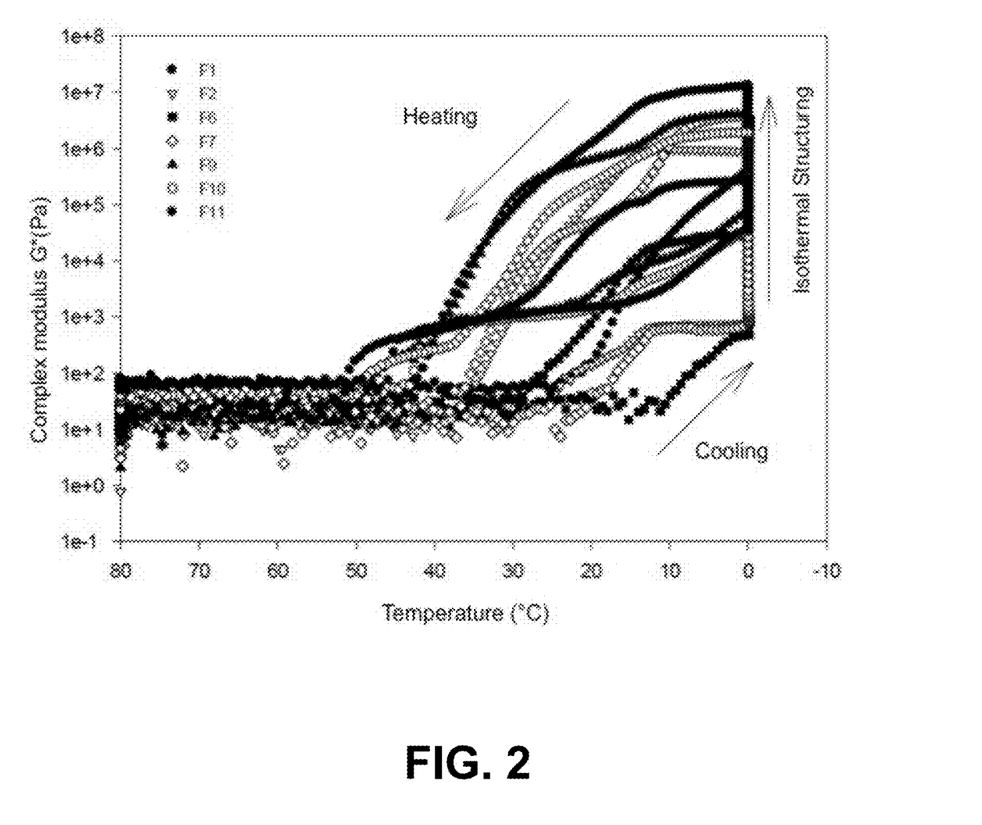
FIG. 2 shows another rheogram G* vs. time (t) and G* vs. Temperature (T) of some examples of embodiment of oleogel compositions for spreadable margarine according to the invention.

FIGS. 1 and 2 show rheograms of G* vs. time (t) and G* vs. Temperature (T) in the examples F1, F2, F6, F6, F8, F10 and F11 applicable in the production of margarine spreads. These rheograms show the same rheological information, but while in FIG. 2 it is easier to see the start of the rheological events and the loop that is formed during the cooling cycle-sustaining-cooling. FIG. 1 shows a better way the temperature slope. The area inside the loop in FIG. 2 reflects the gain of the oleogel structure during the crystallization and isothermal sustaining at 0° C.

FIG. 2 shows that F7, F9 and F10 are comparable in area to F1 but F9 and F10 containing the structuring agent have a faster isothermal structuring. The compositions F9 and F10 differ in the composition of the solid fat component, because the composition F9 is prepared with a mixture of palm fat with a melting point of 36° C., palm fat with a melting point of 45° C. and fully hydrogenated palm fat, while the composition F10 was prepared only with palm fat with a melting point of 36° C. Here it is shown that both fatty acid profiles are practically the same, therefore the difference in melting points may be due to the position of the fatty acids in the glycerol. It is a factor that can affect the properties exhibited by a structured fat.

On the other hand, composition F2 was prepared with palm fat of a melting point of 36° C. and is used for sticks of margarine. This is mainly due to the plasticity and resistance to deformation (complex modulus G* measured in Pa) that develops to crystallize. In its rheogram, during the cool-down period of 80° C. to 0° C. at intervals of 2° C./min, it can be observed that the process of crystallization is fast but incomplete. In fact, it is noted that during the period of isothermal sustaining at 0° C. the phenomena of structuring of fatty material (crystallization) continue. The G* of the fat composition F2 becomes 13.3 MPa. Its resistance to deformation and its rheological evolution post-production allows in industrial practice, just at the exit of the equipment of crystallization, the composition F2 to display a consistency that allows its handling and packaging. Later, during the period of storage in refrigerated rooms the full development of the network of crystals is reached. Therefore, in the phases of fat that are used to produce margarine sticks a crystallization equal to or faster than F2 is looked for. This is observed with a major slope during the period of crystallization and a G* equal to or greater than F2.

On the other hand, the composition F1 is used for spreadable margarines and this is a mixture of palm oil and grease. The evolution of its rheogram during the applied temperature slope shows two rheological events during its crystallization: the first, around 30° C., ending around 12° C. The second stage of crystallization starts 5 minutes after starting the isothermal sustaining at 0° C., at the end of this period, the G* of the composition F1 becomes 0.86 MPa (more than 10 times lower than that of the composition F2). The mixture of fats of composition F1 is used for margarine spreads because it is softer as it offer less resistance to deformation. The occurrence of these rheological events, evidenced by marked changes in the slope of the curve during the crystallization or fusion, is due to the presence of different fractions in the mixture. Therefore, the crystallization and fusion of composition F2 has slight slope changes while composition F1 shows stepped transitions.

Figure 5:
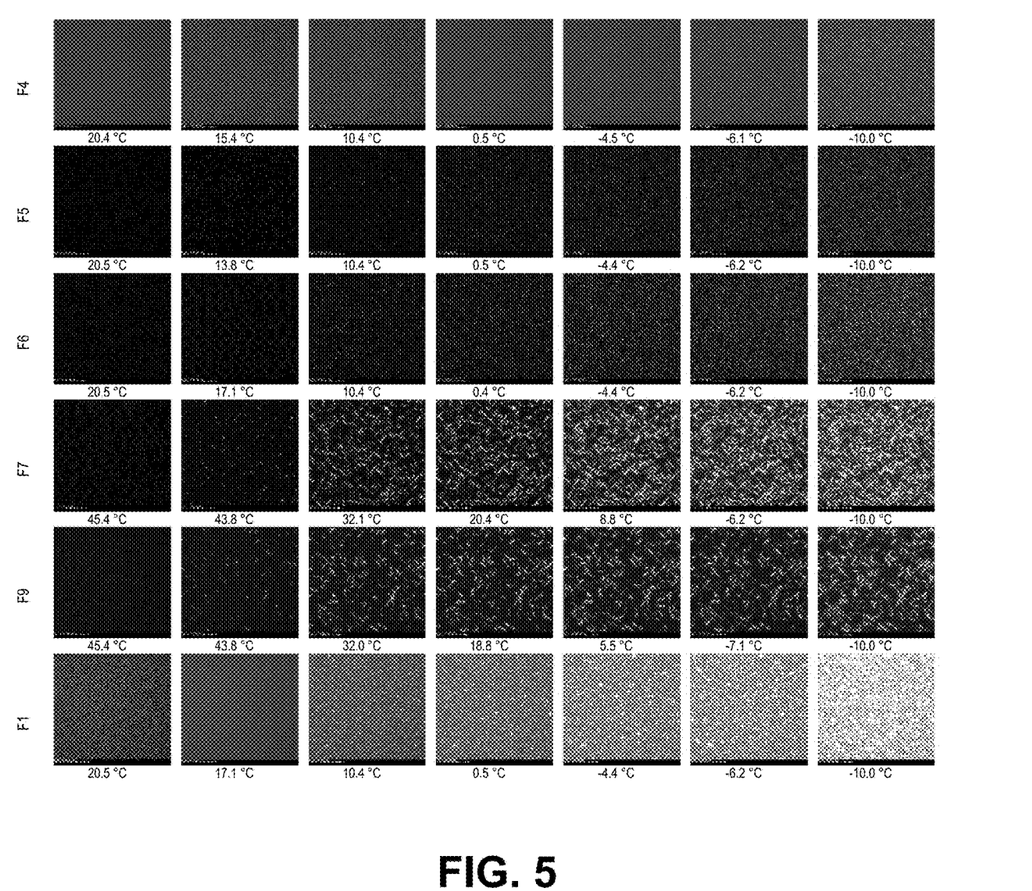
FIG. 5 shows some images of formation of crystals of different oleogel compositions at different temperatures during a stage of crystallization according to the invention.

To contrast the rheograms of compositions F1, F6, F7, F9, F10 and F11 it was found that the rheological profile of composition F1 exceeds composition F6 in speed of crystallization (during the isothermal period at 0° C.) and resistance to deformation, but is exceeded in both aspects by composition F7 (3.7 MPa), composition F9 (4.0 MPa) and composition F10 (1.9 MPa). Finally, composition F11 showed that its starting temperature of crystallization, when an increase of G* (Pa) starts, was higher in composition F1 but its G* was smaller when displaying only 0.26 MPa (3 times less than composition F1). The differences found between compositions F7 and F9 can be attributed both to the addition of the structuring agent, (both of which have a similar profile of fatty acids C12:0, C14:0, C16:0, C18:0, C18:0, C18:1n9c, C18:2n6c and C18:3n3, as well as to the differences in the structuring during cooling (see FIG. 5). In composition F9 4% of a structuring agent was added in its formula and the effect of this addition is evidenced with a crystallization and melting in two events (staggered). Finally, it is notable that composition F11 that contains 5% of the structuring agent exhibits a complex modulus G* of 0.26 MPa against 0.027 of composition F6, when the proportion of saturated fatty acids in composition F11 is 5% lower, whereas the content of polyunsaturated fatty acids is 7% higher. In this way it also states that the differences found in the above-mentioned compositions has an explanation from the microstructural point of view. The former is due to the fact that there was a clear crystal formation within the network formed by the monoglyceride (See FIG. 5, composition F7 vs. composition F9).

Figure 3:
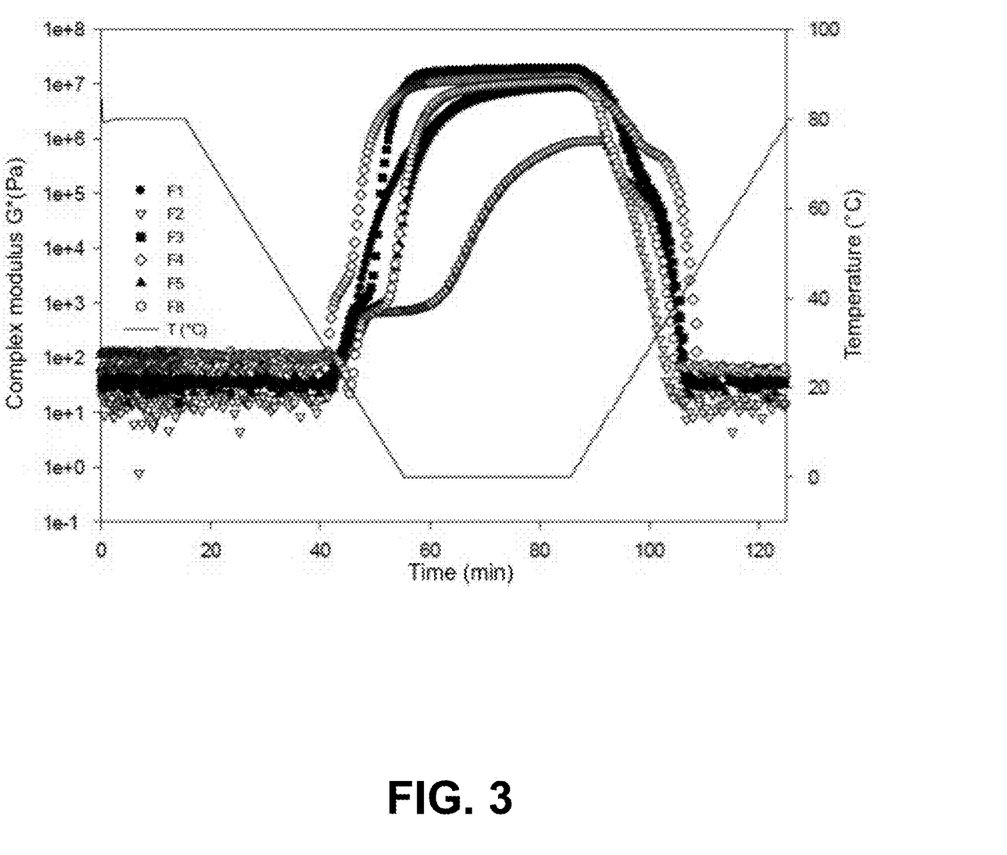
FIG. 3 shows a rheogram G* vs. time (t) and G* vs. Temperature (T) of some examples of embodiment of oleogel compositions for margarine in sticks according to the invention.
Figure 4:
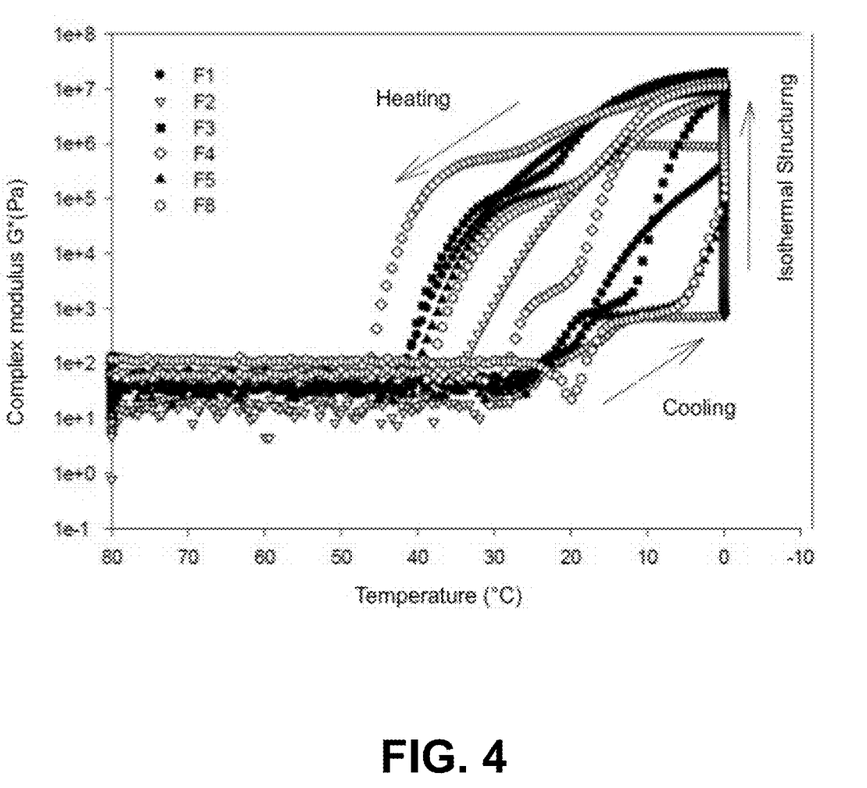
FIG. 4 shows another rheogram G* vs. time (t) and G* vs. Temperature (T) of some examples of embodiment of oleogel compositions for margarine in sticks according to the invention.

Regarding the formulation of margarine sticks, rheograms F3, F4, F5 and F8 show that it is possible to reduce saturated fatty acids and trans fatty acids and at the same time increasing the monounsaturated fatty acid and the polyunsaturated fatty acid (see Tables 1 and 3 and FIGS. 3 and 4). The complex modulus G* was 19.8, 13.3, 8.68 and 11.3 MPa for F3, F4, F5 and F8, respectively. It can be observed that once again there are differences in the rheograms, even when the content of saturated fatty acid has decreased, especially C16:0 and the proportion of C18:2n6c has increased in the formula. In this way, F3, F4 and F5 are formulations of fat mixtures with an evident reduction of fatty acids that are good candidates to be added of distilled monoglyceride of saturated fatty acid to induce changes in the kinetics of crystallization and rheological properties so that they can be used as the fat phase for margarine sticks.

Figure 6:
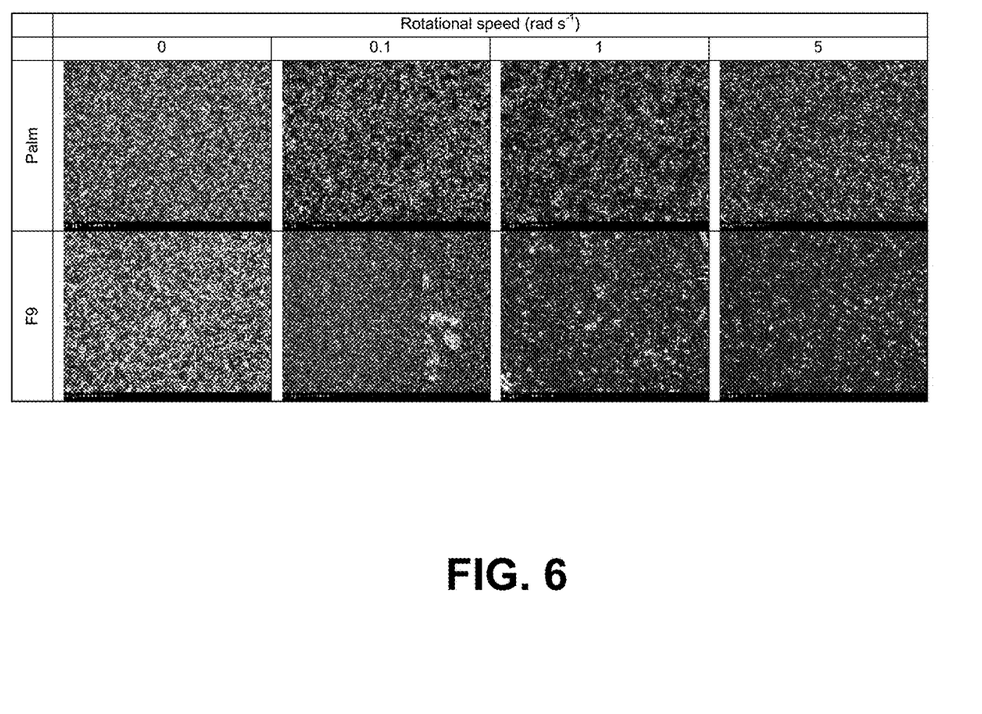
FIG. 6 shows some images of the size distribution of crystals after the oleogel shearing at different speeds during a stage of crystallization according to the invention

FIG. 6 shows a comparison of the size of the crystals obtained with palm of a melting point of 36° C. and composition F9. It can be observed that in both cases in accordance with an increase of the rotational speed the size of the crystals becomes smaller. In this way the structures obtained with distilled monoglyceride of saturated fatty acid can be converted, through mechanical work, in structures similar to those of the palm crystals currently produced.

Examples of the Use of Edible and Thermoreversible Oleogel of the Invention in Food Preparation

Example 1

Double Cream Cheese Production.

The process of incorporation the oleogel depends on the food where it will be applied. In the case of cheese the mass balance is applied according to the desired fat content and the oleogel is emulsified with a skimmed milk. Subsequently, the emulsion is mixed with another stream of fresh milk, skimmed or not, according to the desired fat content. Next the mixture is pasteurized and tempered at room temperature, curd is added and the necessary time is waited to mature the curd. Finally, the curd is cut, drained, salted, molded and the cheese is packed.

Example 2

Production of Panela Cheese Low in Saturated Fat.

The method of preparation used as a raw material (1) vegetable soybean oil or canola oil; (2) fractional butterfat with a high melting point or vegetable soybean fat; (3) distilled monoglycerides of saturated fatty acids. For the preparation of the oleogel a mixture of oil, structuring grease, with proportions that may range from 70% to 95%, 5% to 25%, 1% to 5% by weight, and more preferably of 85%, 15% and 5% by weight, respectively. After mixing the ingredients, these are melted at a temperature preferably between 50° C. to 90° C., and more preferably at 70° C. until their complete dissolution. For the preparation 0,500 kg of the melted oleogel is mixed with 15 liters of skimmed milk at 50° C. Next, they are homogenized at a pressure of 500 PSI to 1500 PSI and mixed with other 15 liters of whole milk. Subsequently, the mixture is pasteurized at a temperature between 63° C. and 80° C., and more preferably at 75° C. Then the mixture is cooled to a temperature between 30° C. to 45° C., and more preferably of 40° C. The curd is added (renin) and it is left to rest for 5 to 30 minutes and most preferably for 10 minutes. Next, it is cut, drained, the grains are compacted, molded and the finished product is packed.

Example 3

Margarine Production Based on Oleogel.

The method of preparation uses as raw material vegetable oil, vegetable fat, distilled monoglycerides of saturated fatty acids. Both the oil (canola, soybean, olive, palm olein) and fat are in accordance with the desired proportion that varies from 50:50 to 95:5% by weight, respectively. Then the structuring agent is added, whose composition varies from 1% to 10% by weight and most preferably from 2% to 3% by weight of the total of the mixture. After mixing the ingredients, these are melted at a temperature preferably between 50° C. to 90° C., and more preferably at 60° C. until their complete dissolution under agitation of 100 rpm to 500 rpm. Then, the fat-soluble flavors, emulsifiers and coloring agents are added. The fat is then mixed with an aqueous phase in a proportion fat phase-aqueous phase of 60:40. In the aqueous phase the conservatives and the salt are dissolved. The mixture is then pasteurized between 60° C. to 90° C. and most preferably at 80° C. under agitation at a speed of 100 rpm to 500 rpm to obtain the emulsion of both phases. The pasteurized mixture is pre-cooled to a temperature between 59° C. to 63° C., then pumped at a speed of 72 kg/hr to 96 kg/hr to a first crystallizer whose scraped surface heat exchanger has a rotation speed of 300 rpm to 400 rpm. This emulsion is cooled in this stage at a temperature of 8° C. to 12° C. Subsequently, the margarine is lead to a bolt rotor to homogenize the size of crystals at a speed of 200 rpm to 300 rpm at a temperature ranging from 0° C. to 25° C. and most preferably from 9° C. to 13° C. Next, the margarine is directed to a second crystallizer whose scraped surface heat exchanger has a rotation speed of 150 rpm to 400 rpm and more preferably of 200 rpm to 320 rpm and its outlet temperature of the margarine is of 0° C. to 10° C. and most preferably from 4° C. to 9° C. The cooling medium used is refrigerant R-22.

In the case of industrial testing, we used a team of 6 tubes of scraped surface and two bolt rotors of 50 liters and 100 liters, respectively. The emulsion is led by means of a high-pressure pump at a flow rate of 1.200 kg/hr to 1.300 kg/hr and an inlet temperature of 44° C. to 46° C. After the first series of two scraped surface heat exchangers the product registers a temperature of 18° C. to 20° C. The margarine circulates by the bolt rotor of 50 liters to homogenize the size of crystals, where its temperature ranges from 20° C. to 22° C. Next, the margarine flows to two other cooling tubes, where the margarine arrives at a temperature of 4° C. to 6° C. The product thus obtained is sent to the second bolt rotor of 100 liters, where it reaches a temperature of 7° C. to 9° C., to go to the last two scraped surface heat exchangers (tubes 5 and 6), obtaining a temperature of 2° C. to 3° C. The coolant used in the industrial tests was ammonia.

Example 4

Production of Meat Emulsion (Sausages).

The method of production uses as raw material the oleogel in its fat phase, water, mechanically separated chicken protein (MDM), soy protein, starch, common salt, nitrites, flavoring, coloring and preservatives. In this case the oleogel is prepared with palm olein palm with a proportion of olein fat are adjusted to the desired proportion that varies from 50:50 to 95:5% by weight, respectively, and more preferably 95:5% by weight. Next, the structuring agent is added whose composition varies from 1% to 10% by weight and most preferably from 1% to 3% by weight of the total of the mixture. The preparation begins with the hydration of the proteins and salts, followed by a later mixture and refined with the oleogel and the rest of the ingredients at a temperature of 6° C. The refining is carried out under vacuum using a knife emulsifier until a homogeneous dispersion is obtained. The resulting product is stuffed and cooked at a temperature between 63° C. to 80° C., and more preferably at 72° C.

On the basis of the achievements described above, it is considered that the amendments to these achievements described above, as well as alternative embodiments will be considered obvious for a person skilled in the art of the technique under this description. It is therefore, contemplated that the claims encompass these achievements that are within the scope of the present invention or its equivalent.

The invention claimed is:

1. An edible and thermoreversible oleogel comprising:
   from 50% to 95% by weight of an oil, wherein the oil is selected from a group consisting of soybean oil, olive oil, canola oil, corn oil, sunflower oil, safflower oil, coconut oil, cotton seed oil, linseed oil, almond oil, peanut oil, algae oil, palm oil, palm stearin, palm olein, hydrogenated palm oil, palm stearin hydrogenated fat, high oleic soybean oil, high oleic canola oil, high oleic sunflower oil, high oleic safflower oil, fully hydrogenated soybean oil, fully hydrogenated canola oil, fully hydrogenated cotton seed oil, high stearic sunflower acid, enzyme and chemical interesterified oils and combinations thereof;

from 1% to 10% by weight of a structuring agent, the structuring agent is a distilled monoglyceride of saturated fatty acid having from 12 to 24 carbon atoms containing more than 90% by weight of monoglycerides and the monoglycerides of the saturated fatty acid are at least 40% by weight of monoglycerides of stearic acid and at least 30% by weight of monoglycerides of palmitic acid; and from 5% to 50% by weight of a fat, wherein the fat is selected from a group consisting of fat of soybean, fat of cotton, fat of fractionated palm, fully hydrogenated palm fat, palm kernel oil, palm stearin, coconut fat, fully hydrogenated vegetable fat, butterfat, fat of pork, beef tallow and combinations thereof, wherein the edible and thermoreversible oleogel has a profile of fatty acids from 16% to 45% by weight of palmitic acid, from 28% to 50% by weight of oleic acid, from 1% to 10% of stearic acid, from 9% to 35% by weight of linoleic acid, from 0.1% to 7% of alpha-linolenic acid, from 1% to 10% by weight of lauric acid, and from 1% to 3% of myristic acid; and has a complex modulus greater than 0.8 MPa when the sample previously melted at 80° C. cools and crystallizes at a speed of 2° C./min up to 0° C. and 30 minutes to 0° C., performing the measurement at 10 Hz and 0.005% of amplitude.

2. The edible and thermoreversible oleogel according to claim 1, wherein further includes an emulsifying agent selected from a group consisting of soy lecithin, phospholipids and combinations thereof.

3. The edible and thermoreversible oleogel according to claim 1, wherein the distilled monoglyceride of saturated fatty acid has a melting point from 65° C. to 90° C.

4. The edible and thermoreversible oleogel according to claim 1, wherein the oleogel is stable without showing phase separation at a temperature from 4° C. to 25° C.

5. A method for replacing a fat fraction to produce a food product selected from a dairy product, a meat product, a product of meat emulsion and a bakery product utilizing the edible and thermoreversible oleogel in accordance with claim 1.

* * * * *